Oct. 28, 1941.  P. M. McHUGH  2,260,577
CLARIFYING CANE SUGAR JUICE
Filed Nov. 18, 1939
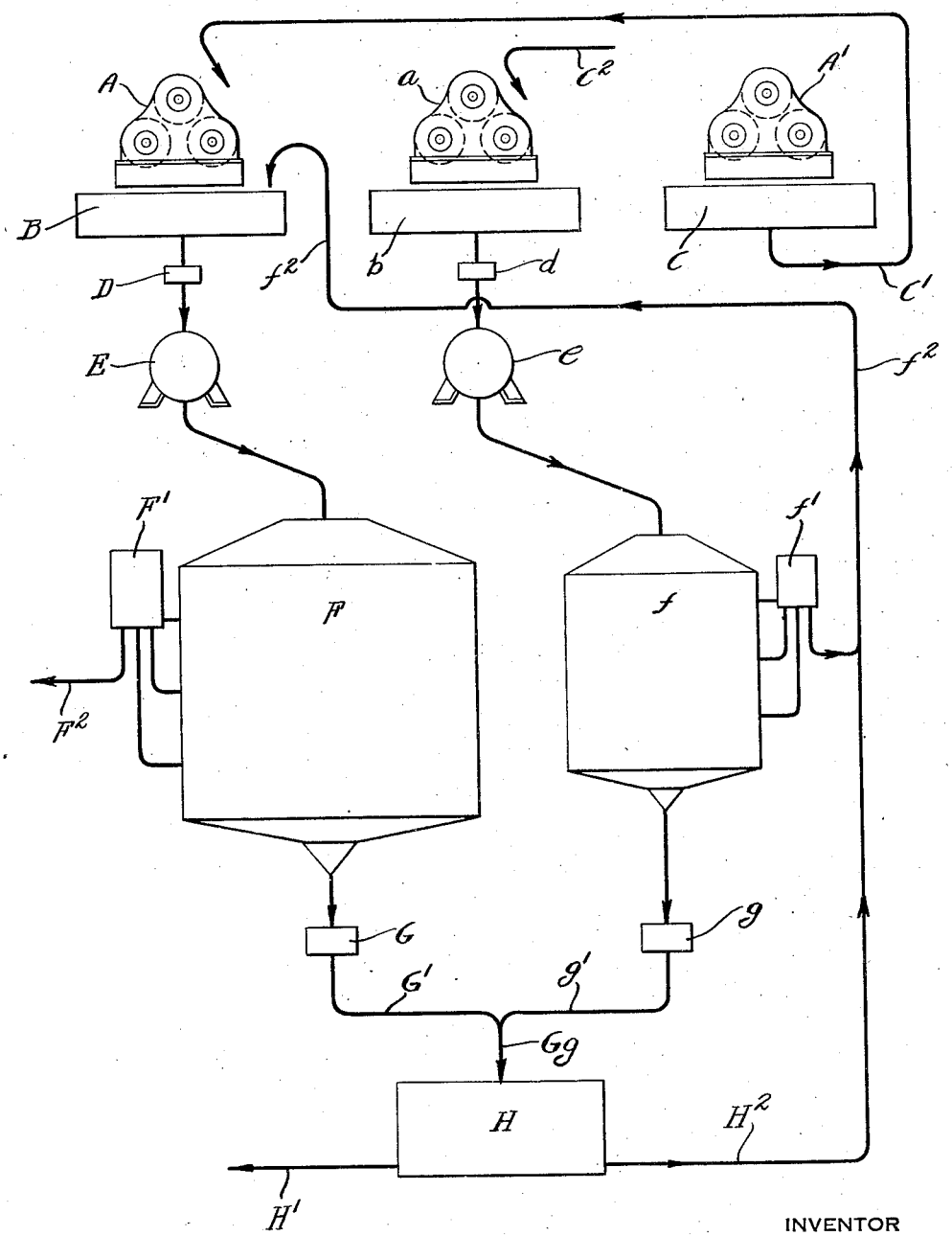
INVENTOR
PHILIP M. McHUGH
BY
John E. Hubbell
ATTORNEY Patented Oct. 28, 1941

2,260,577

UNITED STATES PATENT OFFICE 2,260,577

CLARIFYING CANE SUGAR JUICE

Philip M. McHugh, New York, N. Y., assignor to Petree & Dorr Engineers, Inc., New York, N. Y., a corporation of Cuba Application November 18, 1939, Serial No. 305,061

2 Claims. (Cl. 127—9)

The present invention consists in an improved method of and apparatus for clarifying cane sugar juice, and was primarily devised for use in the clarification of sugar cane juice which is so refractory, from the clarification standpoint, that its satisfactory clarification by the well known "compound clarification" method, is difficult and by simple clarification approaches an economic impossibility.

In the standard compound clarification practice disclosed in the Petree Patent 1,625,680, granted April 19, 1927, the unclarified primary juice, after being heated and limed and mixed with previously clarified secondary juice, is passed into a primary clarifier, which may be a multi-tray Dorr clarifier, or other suitable sedimentation apparatus, from which clarified juice and sludge or "mud" are separately withdrawn. The "mud" withdrawn from the primary clarifier is passed into admixture with unclarified secondary juice, which, after being heated and limed, is passed into a secondary clarifier or sedimentation apparatus, which may be similar to the primary clarifier. The mud from the secondary clarifier is passed to filtering apparatus, and the clear filtrate recovered is usually added to the clarified secondary juice, which as previously stated, is passed into admixture with the primary juice passing to the primary clarifier.

The standard compound clarification method is widely used, and is generally regarded as the best method available for the clarification of most cane sugar juices. However, for example, in clarifying juice from some of the recently developed canes known as P. O. J. varieties, which may have a very low phosphoric acid content, it is practically impossible to flocculate and settle the juice impurities into a sludge or mud containing more than about 5% of insoluble solids. Any unusually low sludge density results in a correspondingly unusually large sludge volume and clarification load.

In attempting to clarify such a juice by the compound clarification method, with a primary clarifier of appropriate capacity, the large volume of primary mud added to the unclarified secondary juice coupled with the mud formed by settling out impurities initially contained in the secondary juice, prevents proper clarification in the secondary clarifier, unless the latter is larger than is desirable from the standpoint of clarifier apparatus bulk and cost, and speed of juice movement through the clarifier. In such a case, if the primary clarifier is of appropriate capacity and the secondary clarifier bears the normal capacity relation to the primary clarifier and is no larger than it needs to be for the proper clarification of the same juice in accordance with the present invention, the secondary clarifier mud pumps will not be able to remove the mud rapidly enough. In consequence, the normal and intended operation of the secondary clarifier will be upset, and there will be such a mud level rise in the secondary clarifier that little or no clarified secondary juice can be withdrawn from the secondary clarifier, so that it becomes necessary to pass all of the secondary juice to the filtering apparatus, which, with less refractory juices, normally receives less than 25% of the secondary juices.

In clarifying juice in accordance with the present invention, I depart from the standard compound clarification practice, by passing the mud withdrawn from the primary clarifier directly into admixture with the mud withdrawn from the secondary clarifier, and then passing the mixture to the filtering apparatus. I thus reduce the secondary clarifier capacity to normal relation with the primary clarifier capacity required. In treatment of very refractory juices, the invention has the practical advantages over the standard compound clarification practice, of reducing the volume and increasing the density of the mud passing to the filtering apparatus, and correspondingly reducing the load on the latter. Furthermore by mixing the secondary mud with the primary mud, I produce a mud mixture having a lower sugar content per unit of volume, than does the primary mud, and I thus save sugar which would be lost if primary mud were subjected to the same filtering procedure without being mixed with the secondary mud.

The invention has the practical advantage, also, that the recombination of apparatus elements necessary to convert an existing compound clarification plant into a clarifying plant adapted for operation in accordance with the present invention ordinarily requires nothing but simple piping changes. The use of the present invention permits of variations in the juice liming procedure. In particular, it permits of the similar separate liming of the primary and secondary juice as contemplated in the above mentioned patent, and, alternately, it permits of the initial overliming of the secondary juice and underliming of the primary juice in accordance with the invention disclosed in the Hartmann Patent No. 2,093,759, granted Sept. 21, 1937, and it also permits of the compound liming procedure disclosed and claimed in a concurrently filed application of Earle M. Copp, Serial No. 305,074, filed November 18, 1939.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

The one figure of the drawing is a diagrammatic representation of a cane sugar milling circuit and associated juice clarifying apparatus.

In the drawing, A designates the first or primary mill, $a$ the second mill, and A' the third mill, of a three mill milling circuit, and B, $b$ and C designates the juice collectors respectively, receiving the juice pressed out of the cane by the mills A, $a$ and A'. In the conventional arrangement illustrated, the juice received by the collector C is used as maceration liquid, being passed by the pipe C' onto the cane passing from the primary mill A to the second mill $a$, and $C^2$ designates a pipe supplying other maceration medium to the cane passing from the second mill to the third mill A'.

As shown, the collector B also receives through a pipe $f^2$, the secondary juice which has already been clarified, as hereinafter described. The juice passes from the collector B to a limer D, and thence to a heater E, from which the juice passes to a Dorr multitray clarifier or other sedimentation tank F, from which clarified juice passes into a juice receiver F', and thence away from the clarifying apparatus through the pipe $F^2$. Mud or sludge is withdrawn from the clarifier F by primary mud discharging apparatus G.

The raw secondary juice passes from the collector $b$ through a limer $d$ and heater $e$ to the secondary clarifier $f$, which may be like the clarifier F, clarified secondary juice passing from the clarifier $f$ into the receiver $f'$, and thence through the pipe $f^2$ to the collector B. Mud or sludge is withdrawn from the secondary clarifier $f$, by mud discharging apparatus $g$, which passes the mud to the filtering apparatus H. The latter may be of usual or suitable type. As diagrammatically shown, H' represents the solids discharge line leading away from the filter H, and $H^2$ represents the pipe through which the filtrate is passed into admixture with the clarified secondary juice passing through the pipe $f^2$ to the collector B.

In so far as above described, the apparatus shown in the drawing does not differ from that customarily employed in compound clarification. In accordance with the present invention, however, the primary mud withdrawn from the primary clarifier F by the pump G, is not passed into admixture with the unclarified secondary juice passing to the secondary clarifier $f$, but is passed into admixture with the mud withdrawn from the secondary clarifier $f$ by the pump $g$, and the mud mixture is passed to the filtering apparatus H. Thus as shown the mud discharge pipes G' and $g'$ of the pumps G and $g$, merge to form a common mud inlet Gg to the filter H.

The apparatus conventionally illustrated, when operated in the manner described above, will satisfactorily clarify refractory juice at a rate substantially greater than that at which the same clarifiers F and $f$, and mud pumps G and $g$ could be used to clarify the same juice by the standard compound clarification method. A special practical advantage of the invention is that it permits the apparatus elements previously used in compound clarification to be recombined in a very simple and inexpensive manner, for the clarification of juice in accordance with the present method, when conditions make it desirable to produce a sugar cane yielding juice more difficult to clarify than the sugar cane previously grown.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The method of clarifying primary juice and secondary juice respectively expressed from sugar cane in primary and subsequent sections of a milling circuit from sugar cane yielding juices too refractory from the clarification standpoint for satisfactory clarification by the known compound clarification method, which consists in subjecting the secondary juice to sedimentation and separating secondary juice thereby clarified from mud containing solids settled out of the secondary juice, adding the clarified secondary juice to the unclarified primary juice, subjecting the juice mixture to sedimentation, separating the juice thereby clarified from the mud containing the solids settled out of the juice mixture, mixing the two muds and filtering the mud mixture.

2. Apparatus for clarifying primary juice and secondary juice respectively expressed from sugar cane in the primary and subsequent sections of a milling circuit from sugar cane yielding juices too refractory from the clarification standpoint for satisfactory clarification by the known compound clarification method, comprising secondary juice liming and heating apparatus, a secondary juice clarifier receiving the limed and heated secondary juice and having separate clarified juice and mud outlets, a second clarifier having separate clarified juice and mud outlets, means for liming and heating the primary juice and passing it into said second clarifier, means for passing clarified secondary juice into admixture with the primary juice prior to the passage of the latter into said second clarifier, filtering apparatus, means for withdrawing mud from each clarifier, and means for mixing the muds so withdrawn and passing the mud mixture to said filtering apparatus.

PHILIP M. McHUGH.